July 20, 1948.     E. H. HORNBARGER     2,445,434
DUAL-VOLTAGE MOTOR CONTROL SYSTEM
Filed July 20, 1946
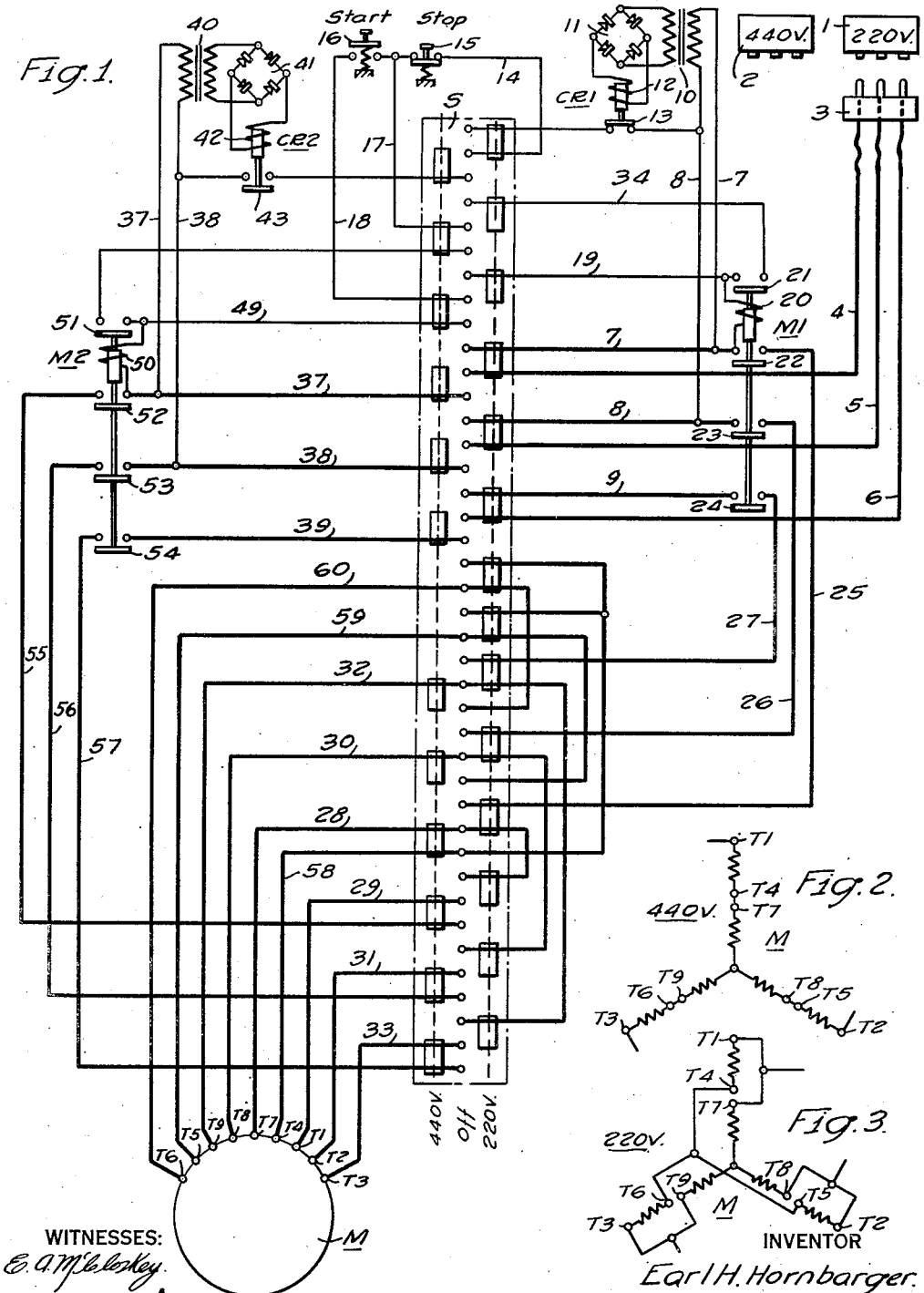
WITNESSES:
INVENTOR
Earl H. Hornbarger.
BY
Paul E. Friedemann
ATTORNEY Patented July 20, 1948

2,445,434

UNITED STATES PATENT OFFICE 2,445,434

DUAL-VOLTAGE MOTOR CONTROL SYSTEM

Earl H. Hornbarger, Edgewood, Pa., assignor to Westinghouse Electric Corporation, East Pittsburgh, Pa., a corporation of Pennsylvania Application July 20, 1946, Serial No. 685,062

6 Claims. (Cl. 318—225)

1

My invention relates to control systems for operating an electric motor selectively from power supply lines of respectively different voltages.

It is an object of my invention to provide a control system for such motors in which the changes of connections, required for a change from one to the other voltage, are made by adjusting a selector or set-up switch and which incorporates simple and reliable means for preventing the motor from being energized when the selected switch setting is not in conformity with the available power supply.

For example, the invention may be applied for controlling a dual voltage induction type motor of a motor generator set aboard a seagoing hopper dredge from an alternating-current power line of either 220 or 440 volts. If the equipment is set up for 220 volts, but fed from a 440 volt line, either the control system or the motor, or both, will be injured by the application of double voltage. On the other hand, if the equipment is set up for 440 volts but fed from a 220 volt power line, the system would not operate properly and the application of half voltage to the coil of alternating-current contactors, which fail to close, is apt to cause overheating and destruction of the coils. Hence, it is a more specific object of my invention to provide the selective controller of dual voltage induction motors with simple and reliable means that protect the equipment from attempted operation under wrong voltage conditions.

In accordance with the invention, I provide two control sections, each for operation of a dual voltage motor by one of the two voltages, with a selective master switch and connect two control relays between the switch and the two respective control sections so that the energization of each section is controlled by the appertaining relay. The coil of each relay is energized through a rectifier from the power supply line. The relay for the high voltage control system is rated so that it will not pick up when energized by low voltage, thus preventing the control section from becoming energized; and the other relay is rated that it is normally in condition for energizing the low-voltage control section and picks up only when high voltage is applied in order to then prevent the energization of the low voltage section.

The drawing shows in Fig. 1, a schematic circuit diagram of a motor control system for a motor of the dual-voltage induction type which is to be energized selectively from a 220 volt line on from a 440-volt line, while Figs. 2 and 3 represent

2 the respective internal field connections of the motor for these different voltages.

Fig. 1 shows schematically a three-phase outlet 1 for 220 volts and another three-phase outlet 2 for 440 volts. The motor control system has a coupling member 3 which can be inserted into either outlet in order to energize the motor M. The coupling 3 is connected by leads 4, 5 and 6 with some of the contact fingers of a selector switch S which has an "off" position and two "on" positions corresponding to the voltage of the available power supply. Assuming at first, for the purpose of convenient explanation, that the selector switch S is placed in the 220-volt position for operation from a 220 volt power supply line, leads 4, 5 and 6 are connected through their respective contact fingers and the correlated contact segments of the selector switch with leads 7, 8 and 9, respectively. A primary winding of a transformer 10 is connected across leads 7 and 8, and hence is energized from the power supply line. A secondary winding of transformer 10 is attached to the input terminals of a rectifying unit 11 whose output terminals are connected to the coil 12 of a control relay CR1. This relay is rated so that primary energization by 220 volts is insufficient to open the relay contact 13, but will open this contact if the coupling 3 is inserted into the 440-volt outlet while the selector switch S is placed in the position for 220 volts. Assuming the contact 13 to remain closed, the lead 8 is connected through this contact and the selector switch with a lead 14. A normally closed stop contact 15, for instance, of the push-button type, is attached to this lead and has its other terminal connected to a lead 17 and to a normally open start contact 16, for instance, also of the push-button type. When the start button is depressed in order to start the motor M, the lead 8 is connected through contact 13, lead 14, contacts 15, 16, a connecting lead 18, and the selector switch S with a conductor 19 and the coil 20 of a contactor M1, so that a current path is established between leads 8 and 7 through the coil 20. The coil then causes the contactor M1 to close its contacts 21, 22, 23 and 24. The closing of contact 21 completes a holding circuit for coil 20 through the leads 34 and the circuit elements 17, 15, 14, 13 and 8. As a result, the contactor M1 stays picked up when thereafter the starting contact is released. The just-mentioned holding circuit includes the stop contact 15. Consequently, the contactor M1 can be made to drop out by depressing the stop contact.

The closing of contacts 22, 23 and 24 energizes the motor M for operation under 220 volts. The motor M has nine terminals denoted by T1 through T9, respectively. Its field windings are connected with these terminals in such a manner that they can be energized in series-connnected or parallel connected pairs according to the circuit diagrams of Figs. 2 and 3. Fig. 2 shows the motor field windings in series connection for excitation by 440 volts, and Fig. 3 shows the same motor field windings connected in parallel for excitation by 220 volts. The change in connection is made by the selector switch S in the manner described presently.

Reverting to the contactor M1 and assuming that contacts 22, 23 and 24 are closed, leads 7, 8 and 9 are connected through respective segments of the switch S with leads 25, 26 and 27, respectively. Lead 25 is connected with lead 28, the latter being attached to motor terminal T7. Lead 25 is further connected through switch S with a lead 29 attached to motor terminal T1. These two connections are in accordance with the showing in Fig. 3. Lead 26 is connected by the selector switch S with two leads 30 and 31 which are attached to motor terminals T8 and T2, in accordance with Fig. 3. Lead 27 is connected through switch S with two leads 32 and 33 which are attached to motor terminals T9 and T3 also as required by the diagram of Fig. 3. Consequently, the selector switch operates also as a set-up contactor for properly connecting the motor field windings in accordance with the voltage of the selected power supply.

When the coupling 3 is inserted in the outlet 2 for a power supply of 440 volts, the motor M would remain inoperative due to the picking-up of relay CR1 if the selector switch S were left in the 220-volt position. If the selector switch is properly adjusted to the 440-volt position, the following connections are established.

Leads 4, 5 and 6 are connected with respective leads 37, 38 and 39. Leads 37 and 38 energize the primary winding of a transformer 40 which feeds its secondary current through a rectifier unit 41 to the coil 42 of a control relay CR2. This relay is rated so that it does not close its contact 43 if the transformer is energized by 220 volts. Since the motor, as explained below, receives its energization through the contact 43, it cannot be set in operation if the switch S is set for 440 volts while coupling 3 is attached to a 220-volt outlet. Under the correct voltage of 440 volts, however, contact 43 will close and thereby connect lead 38 with lead 14, and control contacts 15 and 16 with the associated conductors 17 and 18. Conductor 18 is connected through the switch S with a lead 49 in the circuit of the coil 50 appertaining to a contactor M2. The coil circuit extends through the start contact 16 so that contactor M2 is caused to close its contacts 51, 52, 53 and 54 when the start contact 16 is actuated. Contact 51 then completes a holding circuit through lead 17 and stop contact 15 and hence stays in after the release of the start contact 16. The holding circuit is interrupted if the stop contact 15 is opened so that the contactor M2 will then drop into the open position.

The closing of contacts 52, 53 and 54 connects the leads 37, 38 and 39 with respective leads 55, 56 and 57, which, in turn, are connected through the selector switch with the terminals of the motor M in the manner represented by the diagram of Fig. 2. More in detail, lead 55 is connected with the lead 29 that is attached to motor terminal T1. Lead 56 is connected through the lead 31 with motor terminal T2, and lead 57 is connected through lead 33 with motor terminal T3. At the same time, motor terminal T4 is connected through a lead 58 with lead 28, and hence with motor terminal T7. Motor terminal T8 is connected through leads 30 and 59 with terminal T5, and terminal T9 is connected through leads 32 and 60 with lead T6.

It thus will be seen that the proper selection of switch position establishes all necessary connections within the control system for operating the motor properly in accordance with the available power supply, and that the rectifier energized control relays CR1 and CR2 are effective to prevent the operation of the control system and motor, and hence any resulting damage if the selected switch setting is not in accordance with the voltage of the available power supply.

It will be understood by those skilled in the art that systems as disclosed in the foregoing can be modified in various respects and details within the principles and gist of my invention and without departing from its essential features as set forth in the claims following hereafter.

I claim as my invention:

1. A control system, comprising an induction motor having a plurality of field windings, selector switch means for selectively interconnecting said field windings in different circuit arrangements relative to one another in order to adjust said motor for energization by correspondingly different voltages, current supply means connected with said switch means and disposed for selective connection to power sources of respectively different voltages, a plurality of motor control circuits connected with said switch means and said motor so that a different one of said control circuits is in operative connection with each of said field circuit arrangements respectively, said control circuits having each a voltage responsive relay of respectively different pick-up voltages, said relays having respective contacts disposed in said control circuits respectively for providing energization for said motor only when the selected voltage adjustment of said switch means is in accordance with the voltage of the selected power source.

2. A control system, comprising an induction motor having a plurality of field windings, selector switch means for selectively interconnecting said field windings in different circuit arrangements relative to one another in order to adjust said motor for energization by correspondingly different voltages, current supply means connected with said switch means and disposed for selective connection to power sources of respectively different voltages, a plurality of motor control circuits connected with said switch means and said motor so that a different one of said control circuits is in operative connection with each of said field circuit arrangements respectively, one of said control circuits being designed for low voltage and having a relay provided with a normally closed contact and rated to remain dropped off when energized by low voltage while picking up and opening said contact when energized by high voltage so as to prevent operation of said motor under high voltage when said switch means are adjusted for low voltage, and another one of said control circuits being designed for high voltage and having a relay provided with a normally open contact and rated to pick up only when energized by high voltage in order to prevent operation of said motor under low voltage when said switch is adjusted for high voltage.

3. A control system, comprising an induction motor having a plurality of field windings, selector switch means for selectively interconnecting said field windings in different circuit arrangements relative to one another in order to adjust said motor for energization by correspondingly different voltages, current supply means connected with said switch means and disposed for selective connection to power sources of respectively different voltages, a plurality of motor control circuits connected with said switch means and said motor so that a different one of said control circuits is in operative connection with each of said field circuit arrangements respectively, said control circuits having respective voltage-responsive relays of different pick-up voltages respectively and having respective rectifier means disposed for energizing said respective relays and connected through said switch means with said current supply means, said relays having respective contact means associated with said respective control circuits to prevent energization of said motor when the selected voltage adjustment of said switch means differs from the voltage of the selected power source.

4. A dual-voltage control system, comprising a dual-voltage motor having an even plurality of field windings, selector switch means for interconnecting said field windings in respectively series-connected and parallel-connected pairs in order to adjust said motor for energization by respectively high and low voltages depending upon the selected setting of said switch means, current supply means connected with said switch means and disposed for selective connection to power sources of respectively high and low voltages, two motor control circuits disposed between said switch means and said motor so that either of said control circuits is in operative condition at a time depending upon said selected setting, said control circuits having voltage-responsive relays of respectively different pick-up voltages, said relays having respective contacts associated with said control circuits respectively for controlling said circuits to permit energization of said motor only when the selected voltage adjustment of said switch means corresponds to the voltage of the selected power source.

5. An alternating-current control system, comprising a dual-voltage induction motor having an even plurality of field windings, selector switch means for interconnecting said field windings in respectively series-connected and parallel-connected pairs in order to adjust said motor for energization by respectively high and low voltage depending upon the selected setting of said switch means, current supply means connected with said switch means and disposed for selective connection to power sources of respectively high and low voltages, two motor control circuits disposed between said switch means and said motor so that either of said control circuits is in operative condition at a time depending upon said selected setting, said control circuits having each a voltage-responsive relay and rectifier means disposed for energizing said relay and connected through said switch means with said current supply means, said relays having different contact means disposed in said control circuits respectively and having high and low pick-up voltages respectively so as to prevent energization of said motor when the selected voltage adjustment of said switch means differs from the voltage of the selected power source.

6. An alternating-current control system, comprising a dual-voltage induction motor having an even plurality of field windings, selector switch means for interconnecting said field windings in respectively series-connected and parallel-connected pairs in order to adjust said motor for energization by respectively high and low voltage depending upon the selected setting of said switch means, current supply means connected with said switch means and disposed for selective connection to power sources of respectively high and low voltages, two motor control circuits disposed between said switch means and said motor so that either of said control circuits is in operative condition at a time depending upon said selected setting, said two relays being rated to remain dropped off when energized by low voltage and to pick up when energized by high voltage, one of said relays having a contact closed in the chopped off condition and said other relay having a contact open in the dropped off condition, said contacts being connected between said switch means and said motor for energizing said respective control circuits when closed so that said motor is operative only when the selected setting of said switch means is in accordance with the voltage of the selected power source.

EARL H. HORNBARGER.